US011863382B2

(12) United States Patent
Chunduru Venkata et al.

(10) Patent No.: US 11,863,382 B2
(45) Date of Patent: Jan. 2, 2024

(54) SOFTWARE DEFINED NETWORK DEVICE EXPOSURE TO THIRD PARTIES

(71) Applicant: Verizon Patent and Licensing Inc., Basking Ridge, NJ (US)

(72) Inventors: Sivanaga Ravi Kumar Chunduru Venkata, Irving, TX (US); Kirk Campbell, Long Valley, NJ (US); Raghu Rami Reddy Valisammagari, Murphy, TX (US); Manish Srivastava, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 4 days.

(21) Appl. No.: 17/825,152

(22) Filed: May 26, 2022

(65) Prior Publication Data
US 2022/0345366 A1 Oct. 27, 2022

Related U.S. Application Data

(63) Continuation of application No. 17/238,386, filed on Apr. 23, 2021, now Pat. No. 11,374,813.

(51) Int. Cl.
*H04L 41/0816* (2022.01)
*H04L 41/5003* (2022.01)
*H04L 41/5054* (2022.01)
*H04L 41/5051* (2022.01)

(52) U.S. Cl.
CPC ...... *H04L 41/0816* (2013.01); *H04L 41/5003* (2013.01); *H04L 41/5051* (2013.01); *H04L 41/5054* (2013.01)

(58) Field of Classification Search
None
See application file for complete search history.

(56) References Cited

U.S. PATENT DOCUMENTS

| 7,984,131 | B1 | 7/2011 | Gandhi et al. | |
|---|---|---|---|---|
| 10,938,660 | B1 | 3/2021 | Kapur et al. | |
| 2006/0072477 | A1* | 4/2006 | Bodlaender | H04L 67/303 370/254 |
| 2015/0067643 | A1* | 3/2015 | Behnia | G06F 8/70 717/121 |
| 2015/0319102 | A1* | 11/2015 | Esdaile | H04L 67/535 709/225 |
| 2015/0326535 | A1* | 11/2015 | Rao | H04L 41/5054 726/15 |

(Continued)

*Primary Examiner* — Kevin T Bates
*Assistant Examiner* — Dae Kim

(57) ABSTRACT

Systems and methods described herein provide a co-managed configuration service. A network device stores parameters for the co-managed configuration service. The parameters identify exposed services for an enterprise network that uses devices from a network service provider. The network device receives, via a customer portal, a vendor-agnostic change request for the enterprise network. The change request includes a user role and a change request name for one of the exposed services. The network device authenticates the change request based on the user role and the change request name and retrieves vendor director information for an SDN device implementing the configuration change. The network device invokes, in response to the change request, the configuration change for the enterprise network based on the vendor director information.

20 Claims, 6 Drawing Sheets

(56) References Cited

U.S. PATENT DOCUMENTS

| | | |
|---|---|---|
| 2016/0057015 A1 | 2/2016 | Osborne |
| 2016/0057234 A1 | 2/2016 | Parikh et al. |
| 2016/0308721 A1* | 10/2016 | Dellisanti ........... G06F 11/2035 |
| 2016/0337206 A1 | 11/2016 | Bugenhagen et al. |
| 2017/0187607 A1 | 6/2017 | Shaikh et al. |
| 2018/0239647 A1 | 8/2018 | Tsai et al. |
| 2019/0028372 A1 | 1/2019 | Wang et al. |
| 2019/0058656 A1* | 2/2019 | Gundersen ............. H04L 41/22 |
| 2019/0165997 A1 | 5/2019 | Shaikh et al. |
| 2019/0173750 A1* | 6/2019 | Shaikh ................ G06F 21/6263 |
| 2019/0260636 A1* | 8/2019 | Sun .................... H04L 41/0895 |
| 2019/0372844 A1* | 12/2019 | Moats ................. H04L 41/0806 |
| 2021/0058295 A1* | 2/2021 | Pianigiani ............ H04L 41/022 |

\* cited by examiner

SOFTWARE DEFINED NETWORK DEVICE EXPOSURE TO THIRD PARTIES

CROSS REFERENCE TO RELATED APPLICATION

This patent application is a continuation of U.S. patent application Ser. No. 17/238,386, entitled "Software Defined Network Device Exposure to Third Parties" and filed on Apr. 23, 2021, the disclosure of which is incorporated herein by reference in its entirety.

BACKGROUND

Service providers are using software-defined wide area network (SD-WAN) technology to give enterprise customers more flexible, open, cloud-based WAN services, rather than installing proprietary or specialized WAN technology that often involves expensive fixed circuits or proprietary hardware. In an enterprise setup, a customer may have multiple sites/branches and data centers. Every site and data center typically has a SD-WAN device deployed either as a physical or a virtual network function (VNF). Similarly, each site and/or data center may use separate firewall policies and other WAN settings. Configuration and management can be intricate and time-consuming, given the ever-increasing number of applications, user-types, sites, and devices proliferating throughout an enterprise.

DETAILED DESCRIPTION OF EXAMPLE EMBODIMENTS

The following detailed description refers to the accompanying drawings. The same reference numbers in different drawings may identify the same or similar elements.

In fully-managed enterprise solutions, all aspects of device management such as installation, configuration, administration, and run time operations are performed by a network service provider. With fully-managed solutions, a change management system is typically used in which customers (e.g., enterprise network administrators) submit proposals (e.g., change requests) to make changes to software defined network (SDN) device configurations. The change request process typically includes a complex chain of sub-processes that can take several days or weeks to complete. For example, in existing change management processes, a customer may submit a change request ticket that is assigned to an operations team for the service provider. The operations team would schedule and reserve a time slot to address the ticket. At the scheduled time, the operations team may conduct an analysis for the ticket and change the configuration. After the configuration change, the team would validate the changes and notify the customer by closing the change request ticket.

Customers and networks service providers alike can benefit from a self-service model, referred to herein as a co-managed configuration service, which would allow customers to make policy changes for SDN devices that service an enterprise network. The co-managed configuration service would expedite and simplify some types of network changes over the current fully-managed change processes. One challenge to allowing enterprise customers to directly make changes to SDN devices is effectively limiting access to exposed network functions in the service provider network. Another challenge is minimizing the possibility of such changes causing unintended behavior, which may lead to operational losses and violation of service level agreements (SLAs).

Systems and methods described herein provide a co-managed configuration service that enables self-service management of network configurations for SDN devices. Co-managed configurations may include, for example, policy changes, changes to IP address, and static route additions. According to an implementation, a customer may make configuration changes directly, within a predefined scope, via an enterprise customer portal (e.g., a web-based change management portal). The customer may manage predefined and mutually-agreed-upon network and security changes through custom Application Programming Interfaces (APIs), in effect automating the change requests. Thus, customers of the co-managed configuration service may implement policy and other network changes in an enterprise network without the manual procedures and delays associated with typical managed network services.

Figure 1:
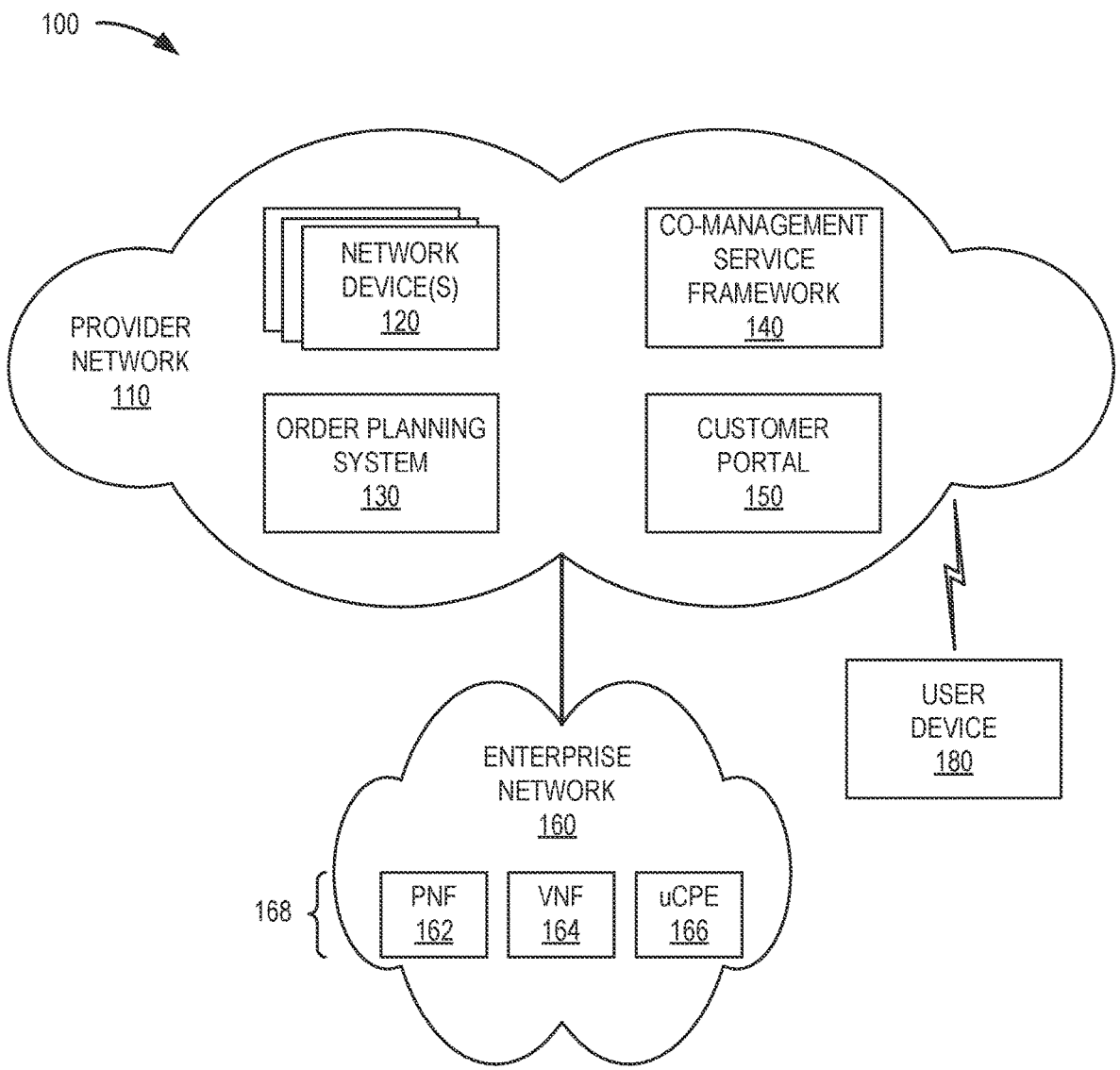
FIG. 1 is a diagram illustrating a network environment according to an implementation described herein.

FIG. 1 is a diagram of an exemplary environment 100 in which the systems and/or methods, described herein, may be implemented. As shown in FIG. 1, environment 100 may include a provider network 110 that provide services to an enterprise network 160. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are exemplary.

Provider network 110 may generally include one or more wired, wireless and/or optical networks that are capable of receiving and transmitting data, voice and/or video signals. For example, provider network 110 may include one or more access networks, IP multimedia subsystem (IMS) networks, core networks, or other networks. The access network may include a wireless communications network that connects users/customers (e.g., using user device 180) to other portions of provider network 110 (e.g., the core network). In one example, the access network may include a Fifth Generation (5G) access network and/or a long-term evolution (LTE) access network. Provider network 110 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, or another type of network that is capable of transmitting data. In an exemplary implementation, provider network 110 may represent a network associated with a service provider that provides various services, such as IP-related services, value added services, etc.

In the example of FIG. 1, provider network 110 may include network devices 120. Each network device 120 may be configured to perform network functions in provider network 110. For example, network device 120 may include a switch, a router, a firewall, a gateway, a Network Address Translation (NAT) device, a Reconfigurable Optical Add-Drop Multiplexer (ROADM), and/or another type of network device. Some or all of the functionality of network device 120 may be virtualized as a virtual network function (VNF) in provider network 110. Depending on the implementation, network 110 may include other types of network devices 120, such as, for example, a base station (e.g., a next-generation NodeB, an evolved NodeB, etc.), a gateway device, a support node, a serving node, a core access and mobility management function (AMF), a session management function (SMF), a policy control function (PCF), as well other network devices that provide various network-related functions and/or services, such as charging and billing, security, authentication and authorization, network policy enforcement, management of subscriber profiles, and/or other functions and/or services that facilitate the operation of the core network. Network devices 120 may receive, store, and enforce policies for end devices in enterprise network 160 (e.g., SDN device instances 168, described below) and other user devices (e.g., user device 180).

According to implementations describe herein, provider network 110 may also include an order planning system 130, a co-management service framework 140, and a customer portal 150. Order planning system 130, co-management service framework 140, and a customer portal 150 may be used to implement a co-managed configuration service for enterprise network 160 and are described further below.

Enterprise network 160 (also referred to herein as a "customer network") may include a network that receives services from provider network 110. Enterprise network 160 may include a local area network (LAN), a WAN, or a combination of networks that provide network access to devices in provider network 110. In one implementation, enterprise network 160 may include a network interconnecting one or more physical network functions (PNF) 162, virtual network functions (VNF) 164 or cloud-native network functions (CNF), and/or universal customer premises equipment (uCPE) 166 (referred to collectively herein as "SDN device instances 168" or "SDN devices 168"). SDN device instances 168 may be provided by different suppliers/vendors for a service provider and may be configured using vendor-specific APIs. In another implementation, enterprise network 160 may include application servers for user devices 180 (e.g., machine-type communication (MTC) devices, mobile devices, etc.). The application servers may, for example, receive and process data from user devices 180. In another implementation, enterprise network 160 may include gateway (GW) routers (e.g., customer premises equipment) that act as a secure gateway for devices within enterprise network 160. As used herein, configuration changes for SDN devices 168 may also refer to changes to a firewall, WAN optimization, or other network changes associated with enterprise network 160.

Order planning system 130 may configure available services for customers (e.g., enterprise network 160) of the co-managed configuration service. Order planning system 130 may include components to receive requests for a scope of available services, generate service orders and work orders, and configure network exposure and APIs for the co-managed configuration service.

Co-management service framework 140 may include a collection of network tools and interfaces to activate the co-managed configuration service and apply policy changes initiated by a customer. Co-management service framework 140 may provide secure exposure of SDN device instances 168 for configuration by customers. Co-management service framework 140 may also provide automated change management with co-management capabilities. Co-management service framework 140 may enable flexible domain-agnostic device access profiles and an API gateway with dynamic ingestion of control logic. Co-management service framework 140 is described further in connection with FIG. 3.

Customer portal 150 may include network devices that provide a web-based interface for a customer (e.g., using user device 180) to access the co-managed configuration service. Via user device 180, users (e.g., customers) of provider network 110 may access customer portal 150 to manage (e.g., introduce, configure, issue commands, update, monitor, etc.) policies for SDN device instances 168 associated with enterprise network 160, for example. Using customer portal 150, customers may manage their SDN device configurations for selected eligible parameters and make changes into SDN device instances 168 by changing the configuration that is managed by the service provider of provider network 110.

User device 180 may include a computational or communication device that is capable of communicating with provider network 110. In one aspect, user device 180 may be used by an operator (e.g., a network administrator) to communicate with network devices 120, order planning system 130, and/or a co-management service framework 140. In another aspect, user device 180 may enable a customer to access customer portal 150 or interact with devices in enterprise network 160. User device 180 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices.

According to implementations described herein, parameters for the co-managed configuration service may be configured using instructions from order planning system 130. The parameters may be stored by co-management service framework 140 and identify exposed policies/services that may be changed by enterprise network 160 customers. An enterprise customer wishing to make network configuration changes, such as setup static routes or open a firewall policy, may use customer portal 150 to open a change request with provider network 110 in co-management service framework 140. As described in more detail below, co-management service framework 140 may authenticate the change request and retrieve vendor director (e.g., a vendor-specific orchestration device or network management system) information for an SDN device (e.g., SDN device instances 168) applying the policy change. Co-management service framework 140 may invoke specific application programming interface (API) call(s) for implemented changes on the SDN device based on the vendor director information. While examples provided herein are described primarily in the context of policy changes for simplicity, the co-managed configuration service may also be used for other network configuration changes in both physical and virtual network functions.

Figure 2:
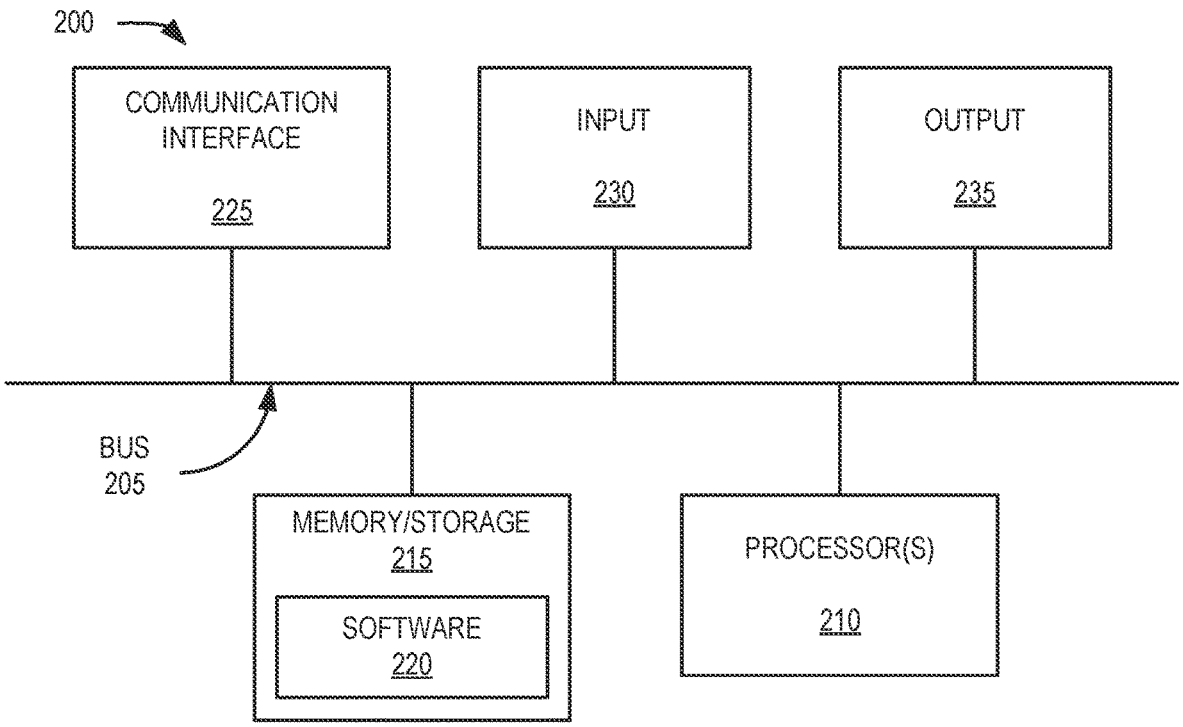
FIG. 2 is a diagram of exemplary components that may be included in one or more of the devices in a co-managed configuration service.

FIG. 2 is a diagram illustrating exemplary components of a device 200 that may correspond to one or more of the devices described herein. For example, device 200 may correspond to components included in network device 120, ordering system 130, SDN device instance 138, co-management service framework 140, customer portal 150, and user device 180. As illustrated in FIG. 2, according to an exemplary embodiment, device 200 includes a bus 205, processor 210, memory/storage 215 that stores software 220, a communication interface 225, an input 230, and an output 235. According to other embodiments, device 200 may include fewer components, additional components, different components, and/or a different arrangement of components than those illustrated in FIG. 2 and described herein.

Bus 205 includes a path that permits communication among the components of device 200. For example, bus 205 may include a system bus, an address bus, a data bus, and/or a control bus. Bus 205 may also include bus drivers, bus arbiters, bus interfaces, and/or clocks.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc. Processor 210 may be a dedicated component or a non-dedicated component (e.g., a shared resource).

Processor 210 may control the overall operation or a portion of operations performed by device 200. Processor 210 may perform operations based on an operating system and/or various applications or computer programs (e.g., software 220). Processor 210 may access instructions from memory/storage 215, from other components of device 200, and/or from a source external to device 200 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium.

Memory/storage 215 may include a drive for reading from and writing to the storage medium. Memory/storage 215 may be external to and/or removable from device 200, such as, for example, a Universal Serial Bus (USB) memory stick, a dongle, a hard disk, mass storage, off-line storage, network attached storage (NAS), or some other type of storage medium (e.g., a compact disk (CD), a digital versatile disk (DVD), a Blu-Ray disk (BD), etc.). Memory/storage 215 may store data, software, and/or instructions related to the operation of device 200.

Software 220 includes an application or a program that provides a function and/or a process. Software 220 may include an operating system. Software 220 is also intended to include firmware, middleware, microcode, hardware description language (HDL), and/or other forms of instruction. For example, according to an implementation, software 220 may implement portions of co-management service framework 140 and customer portal 150.

Communication interface 225 permits device 200 to communicate with other devices, networks, systems, devices, and/or the like. Communication interface 225 includes one or multiple wireless interfaces and/or wired interfaces. For example, communication interface 225 may include one or multiple transmitters and receivers, or transceivers. Communication interface 225 may include one or more antennas. For example, communication interface 225 may include an array of antennas. Communication interface 225 may operate according to a protocol stack and a communication standard. Communication interface 225 may include various processing logic or circuitry (e.g., multiplexing/de-multiplexing, filtering, amplifying, converting, error correction, etc.).

Input 230 permits an input into device 200. For example, input 230 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 235 permits an output from device 200. For example, output 235 may include a speaker, a display, a light, an output port, and/or some other type of visual, auditory, tactile, etc., output component. According to some embodiments, input 230 and/or output 235 may be a device that is attachable to and removable from device 200.

Device 200 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, device 200 performs a process described herein based on the execution of hardware (processor 210, etc.).

Figure 3:
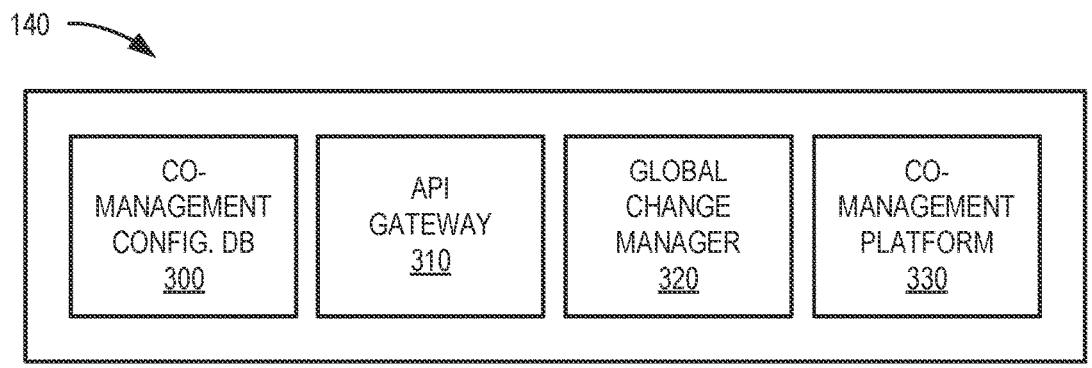
FIG. 3 is a diagram illustrating logical components of a co-management service system, according to an implementation.

FIG. 3 is a block diagram illustrating some exemplary logical components of co-management service framework 140. As shown in FIG. 3, co-management service framework 140 may include a co-management configuration database (DB) 300, an API gateway 310, a global change manager 320, and a co-management platform 330. The components of FIG. 3 may be implemented, for example, by processor 220 in conjunction with memory 230.

Co-management configuration database 300 may store eligible parameters for enterprise network 160 that are available to be changed by a customer (e.g., via customer portal 150). The type/range of eligible parameters for a given customer may be pre-certified by the service provider. Also, co-management configuration database 300 may store API profiles with role-based access control and type of operations that can be performed. The API profile may extend to any domain (e.g., SD-WAN, firewall, WAN Optimization, etc.).

API gateway 310 may generally manage the receipt and initial routing of customer requests for the co-managed configuration service. API gateway 310 may direct requests to other logical components of co-management service framework 140. According to an implementation, API gateway 310 may receive change requests from customer portal 310. The change requests may identify a customer name, a customer role, and a network service category for a particular network change. API gateway 310 may store pre-configured APIs for the customer based on configurations via order planning system 130 and co-management platform 150. In response to change requests from customer portal 150, API gateway 310 may forward API calls to co-management platform 150.

Global change manager 320 may log a change history for each transaction processed through the co-managed configuration service. Global change manager 320 may assign tracking numbers to transactions or groups of transactions, such that every change initiated by a customer is recorded into the change history of GCM 320. The change history may be retrieved to enable a network service provider to back trace changes if problems occur in SDN device instances 138.

Co-management platform 330 may authenticate user change requests and implement network changes for the co-managed configuration service. Co-management platform 330 may translate customer credentials to actual device credentials that can be used to implement changes for SDN device instances 138. Based on change requests with customer name, network service category, and customer role, co-management platform 330 may invoke device-specific APIs for different domains and vendor equipment. Co-management platform 330 may validate if a target device of an API call actually belongs to the customer network, may verify if the API call is to be allowed (e.g., is within the stored co-management parameters), and may validate that incoming API call is same as was approved at initial request.

In operation, an enterprise customer wishing to make network configuration changes may use customer portal 150 to open a change request with co-management service framework 140. GCM 320 may assign a unique ID to the change request, and provide the unique ID to customer portal 150. GCM 320 may also trigger a control plane of co-management platform 330 to provide access approval to API gateway 310. Customer portal 150 would discover device inventory, such as firewalls, for enterprise network 160 and use [[devops]] tools to trigger device APIs with additional details of the change request and Inventory ID of the device onto API gateway 310. The change request may then processed by co-management platform 330, which may validate the change request, confirm that device to be changed is associated to that customer, verify if the API is allowed for the device, and routes the request to the exact device using the inventory ID. Once the change request is served, the API request, response and associated customer access metadata is pushed to GCM 320. After a certain inactivity time, the change request may be closed with GCM 330.

Figure 4:
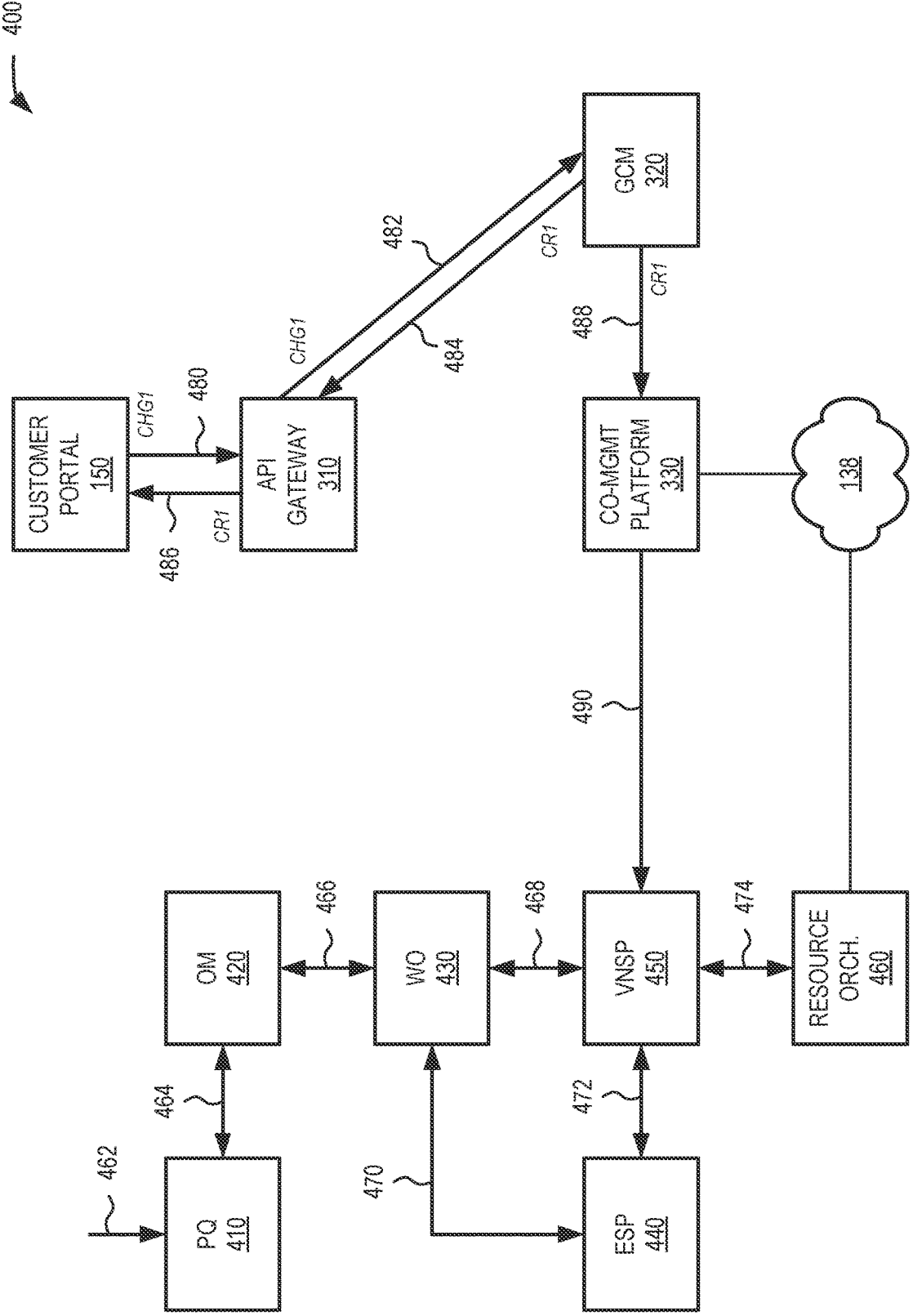
FIG. 4 is a diagram illustrating exemplary communications for enabling a co-managed configuration service, according to an implementation.
Figure 5:
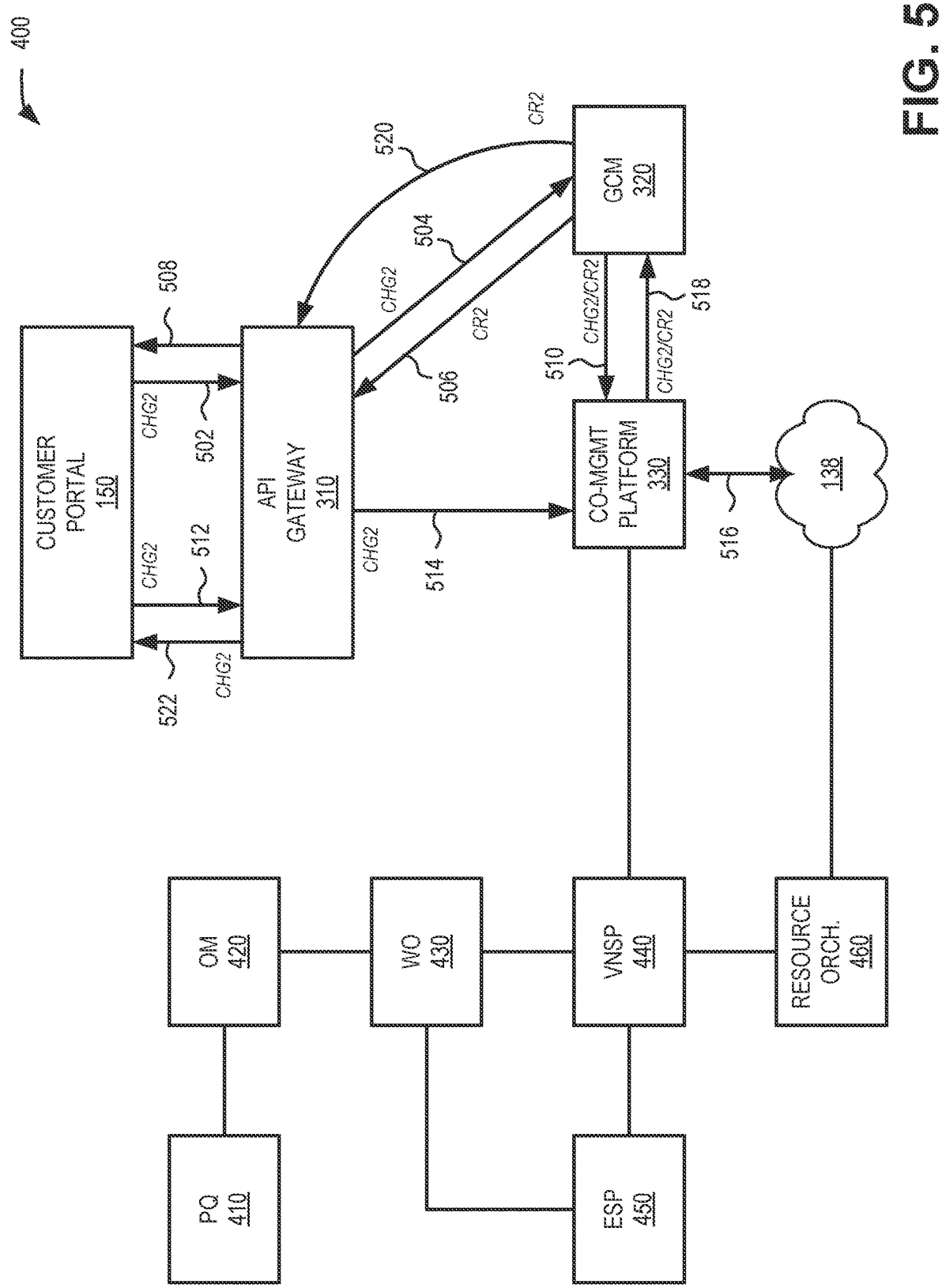
FIG. 5 is a diagram illustrating exemplary communications for implementing the co-managed configuration service, according to an implementation.
Figure 6:
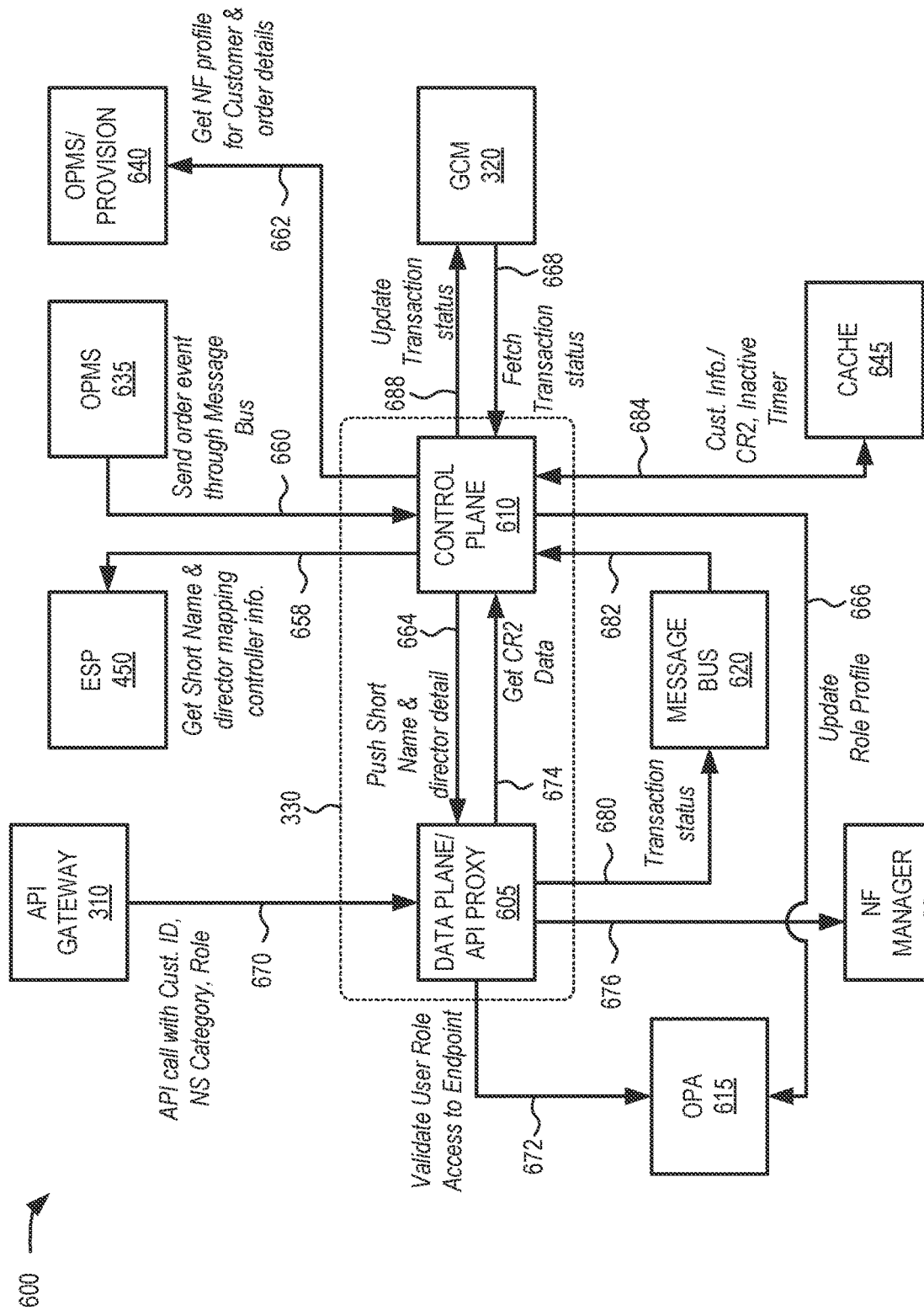
FIG. 6 is a diagram illustrating the separation of data plane and control plane functions in a co-management platform, according to an implementation.

In FIGS. 4-6, communications are described for configuring and activating a co-managed configuration service (FIG. 4) and implementing policy changes using the co-managed configuration service (FIG. 5). FIG. 6 describes additional implementation details for a co-management platform 330 configuration that uses a separate data plane and control plane.

FIG. 4 is a diagram illustrating exemplary communications for enabling a co-managed configuration service in a portion 400 of network environment 100. Similar communications as those shown in FIG. 4 may be used for disabling the co-managed configuration service. FIG. 4 provides simplified illustrations of communications in network portion 400 and are not intended to reflect every signal or communication exchanged between devices/functions.

As shown in FIG. 4, network portion 400 may include customer portal 150, API gateway 310, GCM 320, co-management platform 330, a purchase quoting (PQ) system 410, an order management (OM) system 420, an order orchestration system 430, an enterprise service platform (ESP) 440, a virtual network services platform (VNSP) 450, a resource orchestrator 460, and SDN device instances 138. Purchase quoting system 410, order management system 420, work order (WO) system 430, ESP 440, VNSP 450, and resource orchestrator 460 may correspond to one or more of order planning system 130 or network devices 120.

Collectively, purchase quoting system 410, order management system 420, work order system 430, ESP 440, VNSP 450, and resource orchestrator 460 may perform functions to configure a co-managed configuration service for a particular enterprise customer (e.g., for enterprise network 160). For example, as shown in FIG. 4, purchase quoting system 410 may provide a selection option for a customer to identify a line of services for the co-managed configuration service. Based on a customer selection 462, purchase quoting system 410 may generate and send a corresponding service order 464 to order management system 420. Order management system 420 may provide a corresponding work order 466 to work order system 430. Work order system 430 may divide up work order 466 into work order 470 for ESP 440 and a work order 468 for VNSP 450. Network services platform 450 may include one or more network devices that sort NF instance information by customer. As indicated at reference 472, ESP 440 may inform VNSP 450 once services are operational and VNSP 450 may share service data with co-management platform 330, as further described in FIG. 6, for example. As indicated by reference 474, VNSP 450 may use resource orchestrator 460 to manage both physical and virtual resources such as VNFs 164, PNFs 162, uCPEs 166, and deployment platforms such as uCPE, private cloud platform, public clouds, etc. For example, for VNFs 164, resource orchestrator 460 may perform life cycle management and provisioning; while for PNFs 162, resource orchestrator 460 may perform registration and onboarding of physical appliances.

Customer APIs for the co-managed configuration service may be provided to API gateway 310 (e.g., via co-management platform 330). With the configuration of the co-managed configuration service completed for enterprise network 160, the customer may enable the co-managed configuration service. As further shown in FIG. 4, the customer may use customer portal 150 to submit an enablement change request 480. Based on customer input, customer portal 150 may send change request 480 to enable the co-managed configuration service. Change request 480 may include a unique change request reference number (e.g., CHG1) as a unique identifier for the change request to enable the co-managed configuration service. As indicated by reference 482, API gateway 310 may receive change request 480 and forward the request to GCM 320. GCM 320 may receive forwarded change request 482.

GCM 320 may mark the forwarded change request 482 with a policy co-management label and return a unique response reference number (e.g., CR1) to customer portal 150 via API gateway 310, as indicated by references 484 and 486. The policy co-management label is assigned to ensure that a network services team is able to identify the change request to be associated with the co-managed configuration service if tracking and/or troubleshooting is required. Additionally, GCM 320 may send a message 488 to co-management platform 330 to share the unique response reference number (e.g., CR1) with co-management platform 330. Message 488 may trigger co-management platform 330 to enable the co-managed configuration service for enterprise network 160. In response to message 488, co-management platform 330 may enable the co-managed configuration service and provide a message 490 to inform VNSP 440 that the co-managed configuration service is enabled.

FIG. 5 is a diagram illustrating exemplary communications for implementing a co-managed configuration service in portion 400 of network environment 100. FIG. 5 provides simplified illustrations of communications in network portion 400 and are not intended to reflect every signal or communication exchanged between devices/functions. Communications in FIG. 5 may take place, for example, after the communications for enabling a co-managed configuration service described in FIG. 4.

A customer may use customer portal 150 to submit a policy change request 502. Policy change request 502 may start invoking/enforcing a policy API in accordance with the limits of eligible parameters for enterprise network 160 using the co-managed configuration service. Policy change request 502 may include a unique change request reference number (e.g., CHG2) as an identifier for the transaction. As indicated by reference 504, API gateway 310 may receive policy change request 502 and forward the request to GCM 320. GCM 320 may receive forwarded change request 504.

In response to forwarded change request 504, GCM 320 may acknowledge the change request and return a unique response reference number (e.g., CR2) to customer portal 150 via API gateway 310, as indicated by references 506 and 508. Additionally, GCM 320 may send a message 510 to co-management platform 330 to share both the change request reference number (e.g., CHG2) and the unique response reference number (e.g., CR2) with co-management platform 330. The change request reference number (e.g., CHG2) and the unique response reference number (e.g., CR2) in message 510 may be used to track subsequent API calls for the co-managed configuration service for enterprise network 160.

After receiving the unique response reference number (e.g., CR2) 508, customer portal 150 may invoke one or more policy change 512. The policy change 512 may include the change request reference number (e.g., CHG2) and a DNS entity ID of a controller complex node associated with the device(s) with co-management platform 330. Using the DNS entity ID, API gateway 310 may forward policy change 512 as message 514 to co-management platform 330. Co-management platform 330 may check if the change request reference number (e.g., CHG2) is valid. For example, co-management platform 330 may confirm that a corresponding change request reference number (e.g., CHG2) was received from GCM 320 in message 510. Assuming the change request reference number is valid, co-management platform 330 may invoke the specific policy APIs for the device(s) under consideration (e.g., SDN devices 138), as indicated by reference 516. According to an implantation, message 514 may trigger multiple different API calls 516.

Based on either message 510 or message 514, co-management platform 330 may implement an inactivity timer for the change reference number (e.g. CHG2). The inactivity timer may include a defined time period (e.g., 8 hours, 12 hours, etc.) to accommodate multiple change requests while the change reference number remains active. Upon expiration of the inactivity timer, as indicated by message 518, co-management platform 330 may push the request payload of API call 516 and any responses, mapped to both the change request reference number and the unique response reference number (e.g., CHG2/CR2) to GCM 320. For example, communications for reference 518 may be conducted over a message queue. Message 518 may additionally inform GMC 320 to close/deactivate the both the change request reference number and the unique response reference number (e.g., CHG2/CR2).

GMC 320 may receive message 518 and process the closure of both the change request reference number and the unique response reference number (e.g., CHG2/CR2). As indicated by references 520 and 522, GCM 320 may send via API gateway 310 a response to customer portal 150 to close the API transaction requests FIG. 6 is a diagram illustrating the separation of data plane and control plane functions for co-management platform 330. As shown in FIG. 6, co-management platform 330 may include a data plane 605 and a control plane 610.

Control plane 610 may retrieve configuration information from ESP 450, an OPMS 635, and/or an OPMS/Provisioning system 640. For example, as indicated at references 658, control plane 610 may retrieve data from ESP 450 to map a change request name (e.g., a customer short name) with a particular director (e.g., NF manager 625) for impacted vendor equipment. As indicated by references 660 and 662, control plane 610 may also receive indication of order events (e.g., via a message bus) from OPMS 635 and/or obtain NF profiles for each customer and order details from OPMS/provisioning system 640. As shown in message 664, control plane 610 may push the vendor director information to data plane 605, and data plane 605 may store a configuration file with the mapped customer short name. Thus, data plane 605 may store a configuration file that maps a customer short name to a particular vendor director for SDN equipment that is impacted by that change request. As further indicated by message 666, control plane 610 may update the customer role profile as needed, for subsequent validation of incoming change requests.

As described above in connection with FIG. 5, a customer may initiate a policy change, which may cause GCM 320 to generate a transaction number (e.g., CR2) and provide the transaction number to control plane 610. API gateway 310 may then provide a change request message 670 to data plane/API proxy 605 of co-management platform 330. Change request message 670 may correspond, for example, to message 514 of FIG. 5. Message 670 may include the previously assigned transaction number (e.g., CR2) and an API call with a customer ID, a network service category, and a user role based on input from customer portal 150 (not shown in FIG. 6). According to an implementation, API gateway 310 may provide to customer portal 150 a list of available network service categories. The network service category may identify a type of service for enterprise network 160, such as SDWAN, firewall, LAN, or WLAN, for which co-managed changes may be implemented.

In response to change request message 670, data plane/API proxy 605 may validate the access policy of the endpoint (e.g., the impacted SDN device 168) via OPA 615, as indicated at reference 672. Additionally, data plane 605 may retrieve 674 from control plane 610 the transaction number (e.g., CR2) that GCM 320 will have previously assigned. Assuming role from OPA 615 is validated, data plane 605 may map the customer short name to a vendor director IP address (e.g., for NF manager 625) and provide an API call 676 to NF manager 625 to implement the intent of the change request in message 670.

Along with providing API call 676, data plane 605 may initiate logging of the co-managed policy transaction. For example, data plane 605 may post a transaction status 680 to message bus 620, which may be periodically retrieved 682 by control plan 610. Transaction status 680 may include a record of API call 676 associated with the transaction number (e.g., CR2) and customer identifier. Control plane 610 may store 684 the transaction status in a local cache 645 along with an inactivity timer, for example. Periodically, or upon expiration of the inactivity timer, control plane 610 may forward compiled transaction records 688 to GCM 320, which GCM 320 may use to provide a transaction status or closure (e.g., message 520) to API gateway 310.

Figure 7:
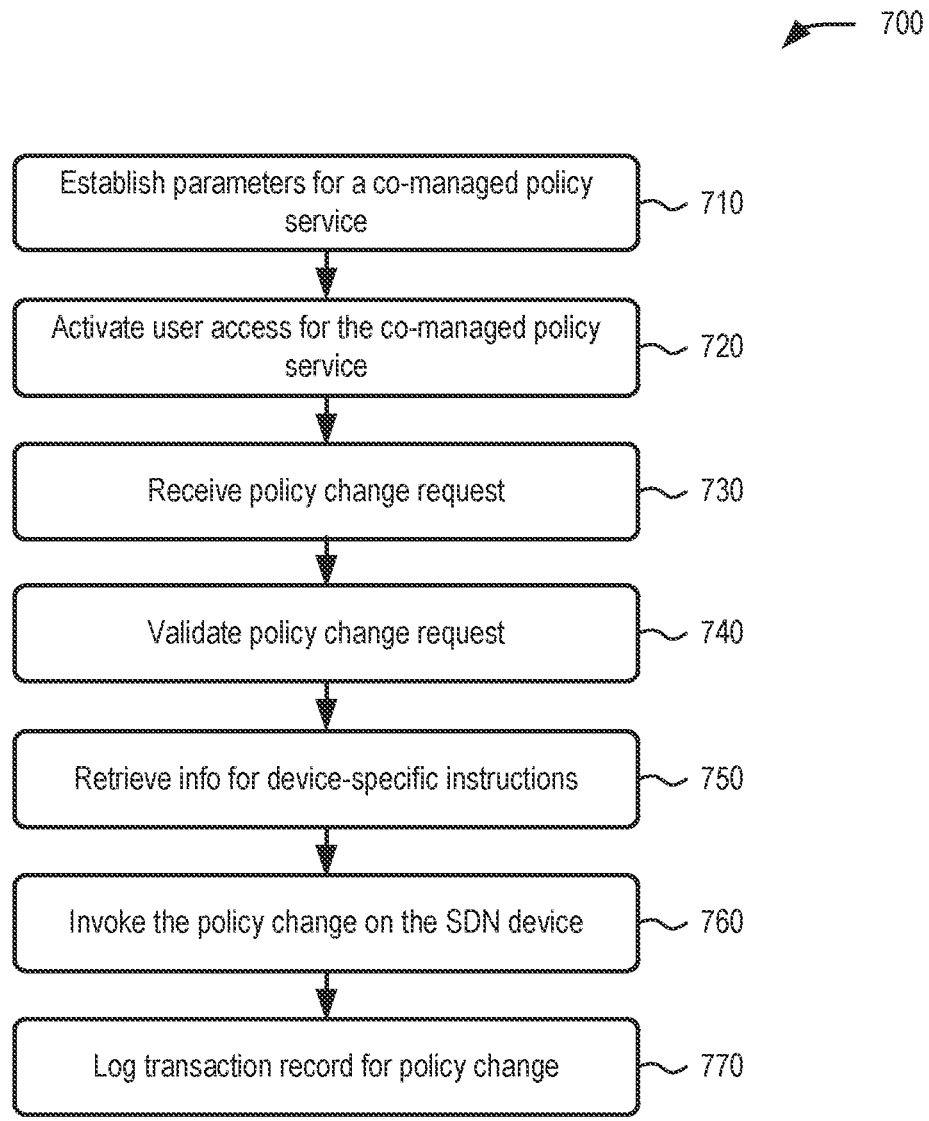
FIG. 7 is a flow diagram illustrating an exemplary process for invoking a change using a co-managed configuration service, according to an implementation.

FIG. 7 is a flow diagram illustrating an exemplary process 700 for invoking a change in using co-managed p configuration policy service, according to an implementation described herein. In one implementation, process 700 may be implemented by co-management service framework 140. In another implementation, process 700 may be implemented by co-management service framework 140 in conjunction with one or more other devices in network environment 100.

Process 700 may include establishing parameters for a co-managed configuration service (block 710), and activating user access for the co-managed configuration service (block 720). For example, as described in connection with FIG. 4, purchase quoting system 410, order management system 420, work order system 430, ESP 440, VNSP 450, and resource orchestrator 460 may perform functions to configure the co-managed configuration service for a particular enterprise customer. The parameters define access and scope of predefined network and security policies that can be managed by an enterprise network customer. As further described in FIG. 4, once the parameters are provisioned, the customer may submit an enablement change request 480 to enable the co-managed configuration service.

Process 700 may further include receiving policy change request (block 730), validating the policy change request (block 740), and retrieving information for device-specific instructions (block 750). For example, as described in FIGS. 5 and 6, API gateway 310 may receive a customer request and provide message 514 to co-management platform 330. Co-management platform 330 may validate that the role of the requesting customer has access to change the endpoint. Once validated, co-management platform 330 may map a customer short name to a vendor director IP address for the impacted SDN device 168.

Process 700 may additionally include invoking the policy change on the SDN device (block 760) and logging transaction record for policy change (block 770). For example, co-management platform 330 may use the mapped vendor directed information to generate a vendor-specific API call and invoke the requested policy change. Using the transaction number assigned at activation, co-management platform 330 may generate a transaction log and store transaction records for back tracing, if necessary.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 7, and message/operation flows with respect to FIGS. 4-6, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by one or more network devices, the method comprising:
   storing parameters for a co-managed configuration service, wherein the parameters identify exposed services for an enterprise network that uses equipment in a provider network;

identifying a network function (NF) manager for network functions that support the exposed services;

receiving, via a customer portal, a change request for one of the exposed services, wherein the change request includes a change request number and a unique response reference number;

receiving, from a change manager device in the provider network, a copy of the unique response reference number associated with the change request number;

confirming that the copy matches the unique response reference number of the change request;

invoking, in response to the change request, a configuration change for the network functions using the NF manager when receipt of the unique response reference number and the copy are confirmed; and generating a transaction record for invoking the change request.

2. The method of claim 1, wherein the parameters include a user profile with a user role and a customer access level for the user role.

3. The method of claim 2, further comprising:
storing a configuration file that maps a customer short name for one of the exposed services to the NF manager,
wherein receiving the change request includes receiving the user role and the customer short name.

4. The method of claim 3, further comprising:
authenticating the change request based on the user role and the customer short name.

5. The method of claim 1, further comprising:
activating user access for the co-managed configuration service, wherein the activating comprises assigning the unique response reference number.

6. The method of claim 1, wherein the exposed services include policies for:
a firewall,
a software defined wide area network (SD-WAN), or
wide area network (WAN) optimization.

7. The method of claim 1, wherein the network functions include:
a physical network function (PNF),
a virtual network function (VNF), or
a cloud-native network function (CNF).

8. The method of claim 1, wherein invoking the configuration change further comprises:
sending a vendor-specific application programming interface (API) call to the NF manager.

9. One or more network devices, comprising:
one or more processors configured to:
store parameters for a co-managed configuration service, wherein the parameters identify exposed services for an enterprise network that uses equipment in a provider network;
identify a network function (NF) manager for network functions that support the exposed services;
receive, via a customer portal, a change request for one of the exposed services, wherein the change request includes a change request number and a unique response reference number;
receive, from a change manager device in the provider network, a copy of the unique response reference number associated with the change request number;
confirm that the copy matches the unique response reference number of the change request;
invoke, in response to the change request, a configuration change for the network functions using the NF manager when receipt of the unique response reference number and the copy are confirmed; and
generate a transaction record for invoking the change request.

10. The one or more network devices of claim 9, wherein the parameters include a user profile with a user role and a customer access level for the user role.

11. The one or more network devices of claim 10, wherein the one or more processors are further configured to:
store a configuration file that maps a customer short name for one of the exposed services to the NF manager, and
wherein, when receiving the change request, the one or more processors are configured to receive the user role and the customer short name.

12. The one or more network devices of claim 11, wherein the one or more processors are further configured to:
authenticate the change request based on the user role and the customer short name.

13. The one or more network devices of claim 12, wherein the exposed services include policies for:
a firewall,
a software defined wide area network (SD-WAN), or
wide area network (WAN) optimization.

14. The one or more network devices of claim 9, wherein the network functions include:
a physical network function (PNF),
a virtual network function (VNF), or
a cloud-native network function (CNF).

15. The one or more network devices of claim 9, wherein the one or more processors are further configured to:
activate user access for the co-managed configuration service, wherein when activating, the one or more processors are further configured to assign the unique response reference number.

16. The one or more network devices of claim 9, wherein, when invoking the configuration change, the one or more processors are further configured to:
send a vendor-specific application programming interface (API) call to the NF manager.

17. A non-transitory computer-readable medium containing instructions executable by at least one processor in a core network, the computer-readable medium comprising the instructions for:
storing parameters for a co-managed configuration service, wherein the parameters identify exposed services for an enterprise network that uses equipment in a provider network;
identifying a network function (NF) manager for network functions that support the exposed services;
receiving, via a customer portal, a change request for one of the exposed services, wherein the change request includes a change request number and a unique response reference number;
receiving, from a change manager device in the provider network, a copy of the unique response reference number associated with the change request number;
confirming that the copy matches the unique response reference number of the change request;
invoking, in response to the change request, a configuration change for the network functions using the NF manager when receipt of the unique response reference number and the copy are confirmed; and
generating a transaction record for invoking the change request.

18. The non-transitory computer-readable medium claim 17, further comprising instructions for:

storing a configuration file that maps a customer short name for one of the exposed services to the NF manager, wherein the instructions for receiving the change request includes instructions for receiving a user role and the customer short name.

19. The non-transitory computer-readable medium of claim 17, wherein the parameters include a user profile with a user role and a customer access level for the user role.

20. The non-transitory computer-readable medium of claim 17, further comprising instructions for:

activating user access for the co-managed configuration service, wherein the activating comprises assigning the unique response reference number.

* * * * *